(12) United States Patent
Kaufmann et al.

(10) Patent No.: US 11,886,960 B2
(45) Date of Patent: Jan. 30, 2024

(54) ELASTIC TRAINING OF MACHINE LEARNING MODELS VIA RE-PARTITIONING BASED ON FEEDBACK FROM THE TRAINING ALGORITHM

(71) Applicant: International Business Machines Corporation, Armonk, NY (US)

(72) Inventors: Michael Kaufmann, Adliswil (CH); Thomas Parnell, Zurich (CH); Antonios Kornilios Kourtis, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 1078 days.

(21) Appl. No.: 16/405,329

(22) Filed: May 7, 2019

(65) Prior Publication Data
US 2020/0356893 A1    Nov. 12, 2020

(51) Int. Cl.
  *G06N 20/00*   (2019.01)
  *G06N 3/08*    (2023.01)
  (Continued)

(52) U.S. Cl.
  CPC ....... *G06N 20/00* (2019.01); *G06F 15/17331* (2013.01); *G06N 3/08* (2013.01); *G06N 3/084* (2013.01)

(58) Field of Classification Search
  CPC .......... G06N 20/00; G06N 3/08; G06N 3/084; G06F 15/17331
  See application file for complete search history.

(56) References Cited

U.S. PATENT DOCUMENTS

| 9,292,550 B2 | 3/2016 | Yarmus |
| 2014/0019984 A1* | 1/2014 | Li ................ G06F 9/5027 718/102 |

(Continued)

FOREIGN PATENT DOCUMENTS

| KR | 101691305 B1 * | 9/2015 | |
| KR | 1691305 B1 * | 12/2016 | ......... G06Q 30/0241 |
| WO | 2016/004075 A1 | 1/2017 | |

OTHER PUBLICATIONS

Ahn et al., "Soft memory box: A virtual shared memory framework for fast deep neural network training in distributed high performance computing", 2018, IEEE Access, vol. 6, pp. 26493-26504 (Year: 2018).*

(Continued)

*Primary Examiner* — Ann J Lo
*Assistant Examiner* — Leonard A Sieger
(74) *Attorney, Agent, or Firm* — Scully, Scott, Murphy & Presser, P.C.; Daniel P. Morris

(57) ABSTRACT

Parallel training of a machine learning model on a computerized system may be provided. Computing tasks can be assigned to multiple workers of a system. A method may include accessing training data. A parallel training of the machine learning model can be started based on the accessed training data, so as for the training to be distributed through a first number K of workers, K>1. Responsive to detecting a change in a temporal evolution of a quantity indicative of a convergence rate of the parallel training (e.g., where said change reflects a deterioration of the convergence rate), the parallel training of the machine learning model is scaled-in, so as for the parallel training to be subsequently distributed through a second number K' of workers, where K>K'≥1. Related computerized systems and computer program products may be provided.

20 Claims, 6 Drawing Sheets

(51) Int. Cl.
G06N 3/084 (2023.01)
G06F 15/173 (2006.01)

(56) References Cited

U.S. PATENT DOCUMENTS

| | | | | |
|---|---|---|---|---|
| 2014/0380320 | A1* | 12/2014 | Lin | G06F 9/4881 |
| | | | | 718/102 |
| 2015/0025848 | A1* | 1/2015 | Fukumoto | G06F 9/5061 |
| | | | | 702/186 |
| 2016/0078361 | A1 | 3/2016 | Brueckner et al. | |
| 2016/0162800 | A1 | 6/2016 | Qin et al. | |
| 2016/0307098 | A1 | 10/2016 | Goel et al. | |
| 2017/0236072 | A1 | 8/2017 | Rendle et al. | |
| 2018/0314971 | A1 | 11/2018 | Chen et al. | |
| 2020/0042362 | A1* | 2/2020 | Cui | G06T 1/20 |
| 2020/0159589 | A1* | 5/2020 | Capes | G06F 9/5061 |

OTHER PUBLICATIONS

Kwon et al., "Beyond the Memory Wall: A Case for Memory-centric HPC System for Deep Learning", 2018, 2018 51st Annual IEEE/ACM International Symposium on Microarchitecture, vol. 51 (2018), pp. 148-161 (Year: 2018).*

Phanishayee et al., "PipeDream: Fast and Efficient Pipeline Parallel DNN Training", 2018, arXiv, v1806.03377v1, pp. 1-14 (Year: 2018).*

Peng et al., "Optimus: An Efficient Dynamic Resource Scheduler for Deep Learning Clusters", 2018, Proceedings of the Thirteenth EuroSys Conference, vol. 13 (2018), pp. 1-14 (Year: 2018).*

Qiao et al., "Litz: Elastic Framework for High-Performance Distributed Machine Learning", 2018, 2018 USENIX Annual Technical Conference, vol. 2018, pp. 631-643 (Year: 2018).*

Smith et al., "CoCoA: A General Framework for Communication-Efficient Distributed Optimization", 2018, Journal of Machine Learning Research, vol. 18 (2018), pp. 1-49 (Year: 2018).*

Zhang et al., "SLAQ: Quality-Driven Scheduling for Distributed Machine Learning", 2017, Proceedings of the 2017 Symposium on Cloud Computing, vol. 2017, pp. 390-404 (Year: 2017).*

Dai et al., "Toward Understanding the Impact of Staleness in Distributed Machine Learning", 2018, arXiv, v1810.03264v1, pp. 1-19 (Year: 2018).*

Dunner, C., et al., "Primal-Dual Rates and Certificates", arXiv preprint arXiv:1602.05205v2, Jun. 2, 2016, 23 pages.

Dunner, C., et al., "Snap ML: A Hierarchical Framework for Machine Learning", 32nd Conference on Neural Information Processing Systems (NeurIPS 2018), Dec. 2-8, 2018, 11 pages.

Harlap, A., et al., "Proteus: agile ML elasticity through tiered reliability in dynamic resource markets", EuroSys '17, Apr. 23-26, 2017, 16 pages.

Jaggi, M., et al., "Communication-Efficient Distributed Dual Coordinate Ascent", Advances in Neural Information Processing Systems, Sep. 2014, 9 pages.

Lin, T., et al., "Don't Use Large Mini-Batches, Use local SGD", arXiv:1808.07217v4, Feb. 5, 2019, 30 pages.

Qiao, A., et al., "Litz: An Elastic Framework for High-Performance Distributed Machine Learning", Proceedings of the 2018 USENIX Annual Technical Conference (USENIX ATC '18), Jul. 11-13, 2018, pp. 631-643.

Sikdar, S., An Experimental Comparison of Complex Object Implementations for Big Data Systems, In Proceedings of the 2017 Symposium on Cloud Computing, SoCC '17, Sep. 24-27, 2017, pp. 432-444.

Smith, V., "CoCoA: A General Framework for Communication-Efficient Distributed Optimization", Journal of Machine Learning Research, Submitted Oct. 2016, Published Jul. 2018, pp. 1-49, vol. 18.

Stuedi, P., et al., "Crail: A High-Performance I/O Architecture for Distributed Data Processing", Bulletin of the Technical Committee on Data Engineering, Mar. 2017, pp. 38-49, vol. 40, No. 1.

Zaharia, M., et al., "Spark: Cluster Computing with Working Sets", Proceedings of the 2Nd USENIX Conference on Hot Topics in Cloud Computing, HotCloud'10, USENIX Association, Jul. 2010, 7 pages.

Zhang, H., et al., "Slaq: Quality-Driven Scheduling for Distributed Machine Learning", SoCC' 17, Sep. 24-27, 2017, 15 pages.

Zhang, J., et al., "An Adaptive Synchronous Parallel Strategy for Distributed Machine Learning", IEEE Access, Special Section on Novel Learning Applications and Services for Smart Campus, pp. 19222-19230, vol. 6.

Wajahat, M., et al., "Using Machine Learning for Black-Box Autoscaling", 2016 Seventh International Green and Sustainable Computing Conference (IGSC), Jan. 2016, 8 pages.

Hsieh, C.-J., et al., "PASScoDe: Parallel ASynchronous Stochastic Dual Co-ordinate Descent", Proceedings of the 32nd International Conference on Machine Learning, Apr. 2015, 10 pages, JMLR: W&CP vol. 37.

Liu, J., et al., "An Asynchronous Parallel Stochastic Coordinate Descent Algorithm", Journal of Machine Learning Research, Submitted Jun. 2014, Published Feb. 2015, pp. 285-322, vol. 16.

Parnell, T., et al., "Tera-scale coordinate descent on GPUs", Future Generation Computer Systems, Received in revised form Jan. 24, 2018, Accepted Apr. 23, 2018, 19 pages.

Niu, F., et al., "HOGWILD!: A Lock-Free Approach to Parallelizing Stochastic Gradient Descent", Advances in Neural Information Processing Systems, Jun. 2011, 9 pages.

Shalev-Shwartz, S., et al., "Stochastic Dual Coordinate Ascent Methods for Regularized Loss", Journal of Machine Learning Research, Submitted Sep. 2012, Revised Jan. 2013, Published Feb. 2013, pp. 567-599, vol. 14.

List of IBM Patents or Patent Applications Treated as Related, dated May 7, 2019, 2 pages.

Meng, Q., et al., "Convergence analysis of distributed stochastic gradient descent with shuffling", Neurocomputing (2019), Revised Nov. 1, 2018, Accepted Jan. 14, 2019, Available online Jan. 22, 2019, pp. 46-57, vol. 337.

Chung, J., et al., "UberShuffle: Communication-efficient Data Shuffling for SGD via Coding Theory", 31st Conference on Neural Information Processing Systems (NIPS 2017), 2017, 7 pages.

Office Action dated May 5, 2022 received in U.S. Appl. No. 16/405,334, 18 pages.

Office Action dated Aug. 26, 2022 received in U.S. Appl. No. 16/405,334, 13 pages.

* cited by examiner

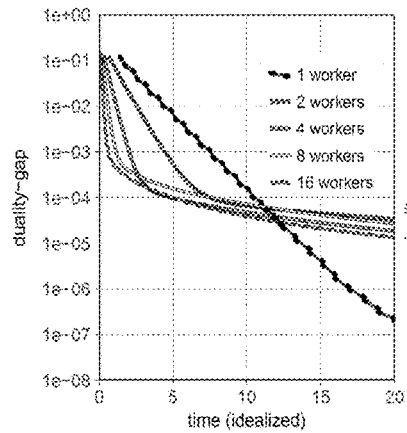 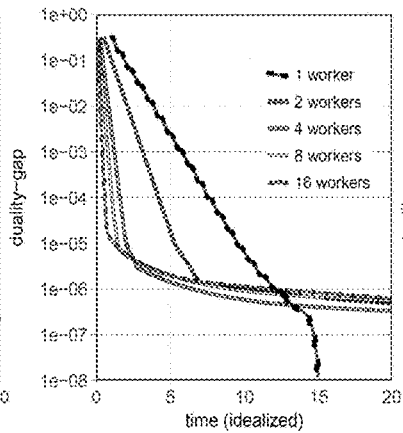 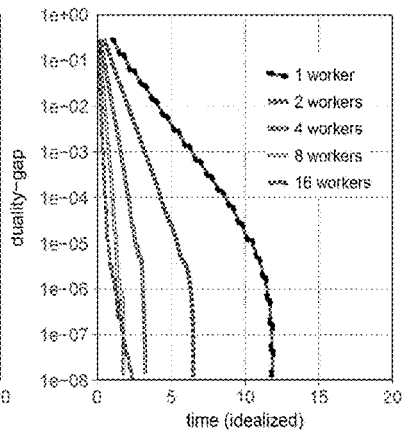
FIG. 1(a)  FIG. 1(b)  FIG. 1(c)
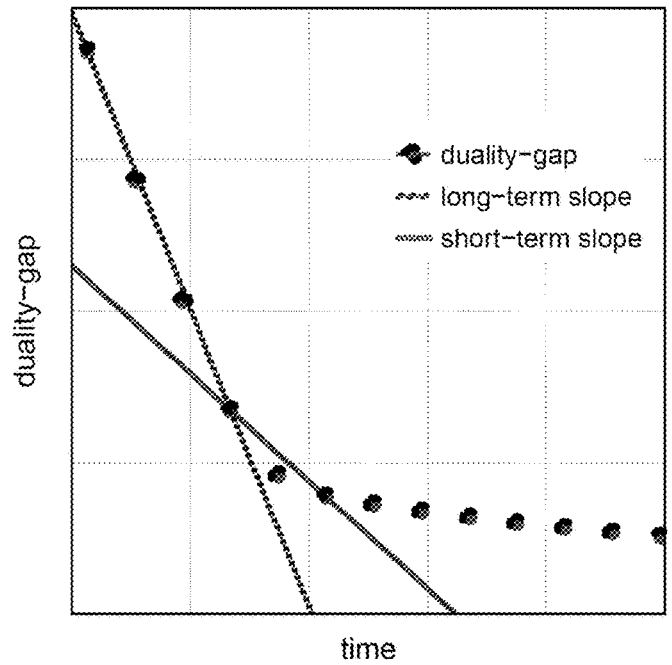
FIG. 2

ELASTIC TRAINING OF MACHINE LEARNING MODELS VIA RE-PARTITIONING BASED ON FEEDBACK FROM THE TRAINING ALGORITHM

BACKGROUND

The present disclosure relates in general to the field of computer-implemented methods and systems enabling a parallel training of a machine learning model such as a generalized linear model. In particular, it is directed to methods and systems that scale-in the training of the model upon detecting a deterioration of the convergence rate of the training.

As data becomes a major source of insight, machine learning (ML) grows into a dominant workload in many (public and not-public) cloud environments. Ever-increasing collection of data further drives development of efficient algorithms and systems for distributed ML as resource demands often exceed the capacity of single nodes. However, given the usage of cloud resources, a distributed run poses additional challenges in terms of resource utilization. Recently, several works have aimed to improve resource utilization and flexibility of ML applications.

For example, the so-called Communication-efficient distributed dual Coordinate Ascent (CoCoA) framework was proposed for efficient, distributed training of generalized linear models (GLMs). CoCoA may outperform other distributed methods, such as mini-batch versions of stochastic gradient descent (SGD) and stochastic dual coordinate ascent (SDCA) by minimizing the amount of communication necessary between the training steps.

SUMMARY

According to an aspect, the present invention is embodied as a computer-implemented method of parallel training of a ML model on a computerized system. This system is assumed to be such that its computing tasks can be assigned to multiple workers of the system. The method comprises accessing training data. Then, a parallel training of the ML model is started based on the accessed training data, so as for the training to be distributed through a first number K of workers, where K>1. Next, upon detecting a change in a temporal evolution of a quantity indicative of a convergence rate of the parallel training (where said change reflects a deterioration of the convergence rate), the parallel training of the ML model is scaled-in, so as for the parallel training to be subsequently distributed through a second number K' of workers, where K>K'≥1.

Said ML model can be a generalized linear model (GLM). In addition, said quantity can be a duality-gap measuring a distance between a primal formulation of a training objective for said training and a dual formulation of this training objective. Said change in the temporal evolution may advantageously be detected by comparing a short-term evolution of the duality-gap to a long-term evolution thereof, where said long-term evolution extends over a longer period of time than said short-term evolution.

According to another aspect, the invention is embodied as a computerized system. The latter has an architecture adapted for assigning computing tasks to multiple workers of the system. The system stores a computerized method of parallel training of a ML model, whereby the system is configured to perform steps as recited above, in operation (e.g., when said computerized method is run on the system). That is, the system accesses training data and then starts a parallel training of the ML model based on the accessed training data. The parallel training is first distributed through a first number K of workers of the system, K>1. Next, upon detecting a change in a temporal evolution of a quantity indicative of a convergence rate of the parallel training (said change reflecting a deterioration of this convergence rate), the system proceeds to scale-in the parallel training of the ML model, so as for the parallel training to be subsequently distributed through a second number K' of workers, where K>K'≥1.

According to yet another aspect, the invention is embodied as a computer program product for parallel training of a ML model on a computerized system, whose computing tasks can be assigned to multiple workers thereof, as evoked above. The computer program product comprises a computer readable storage medium having program instructions embodied therewith, wherein the program instructions are executable on the computerized system to cause the latter to take steps as described above in reference to the present computer-implemented methods.

Computerized systems, methods, and computer program products embodying the present invention will now be described, by way of non-limiting examples, and in reference to the accompanying drawings.

BRIEF DESCRIPTION OF THE DRAWINGS

The accompanying figures, where like reference numerals refer to identical or functionally similar elements throughout the separate views, and which together with the detailed description below are incorporated in and form part of the present specification, serve to further illustrate various embodiments and to explain various principles and advantages all in accordance with the present disclosure, in which:

FIGS. 1(a), 1(b), and 1(c) are plots illustrating the convergence of the duality-gap (a quantity that is indicative of the convergence rate of the training) for three distinct datasets, using 1 to 16 workers, assuming perfect scaling and zero communication cost;

FIG. 2 depicts long-term and short-term slopes of the duality-gap (as it evolves over time during a parallel training), which are used to detect a knee of the temporal evolution of the duality-gap. Said knee corresponds to a substantial change in said temporal evolution and determines a moment in time, at which the training of the ML model is scaled-in, as in embodiments;

The accompanying drawings show simplified representations of computerized systems or parts thereof, as involved in embodiments. Similar or functionally similar elements in the figures have been allocated the same numeral references, unless otherwise indicated.

DETAILED DESCRIPTION

Figure 3A:
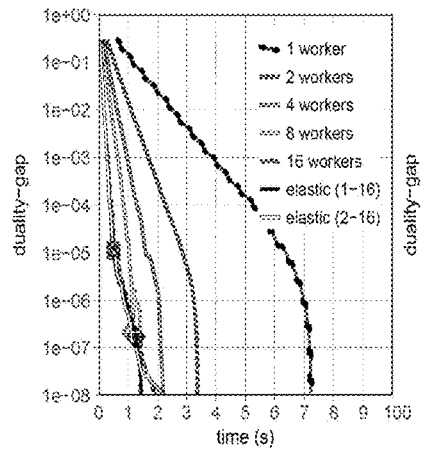
FIGS. 3(a) to 3(f) depict scale-in operations as performed in embodiments. The figures depict the duality-gap vs. time for given datasets and settings. Circles denote scale-in operations from 16 to 4 workers, while diamonds reflect scale-in operations from 4 to 2 or 1 worker(s)
Figure 3B:
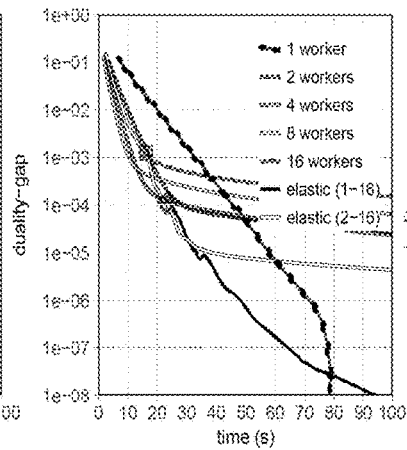
Figure 3C:
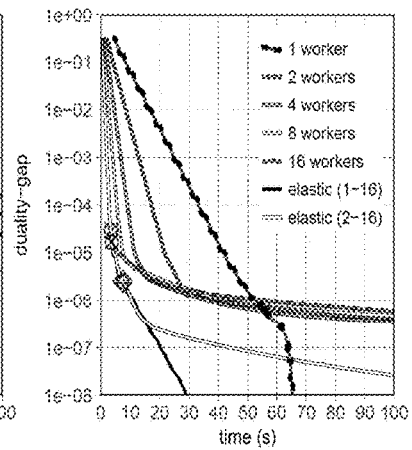
Figure 3D:
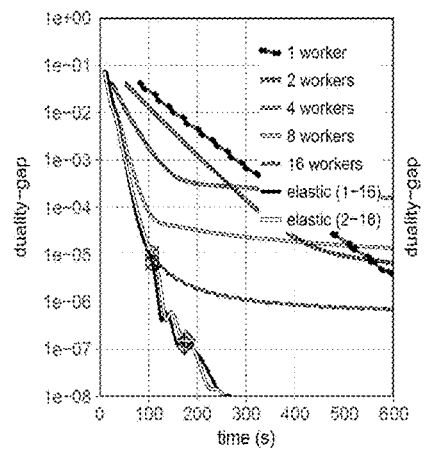
Figure 3E:
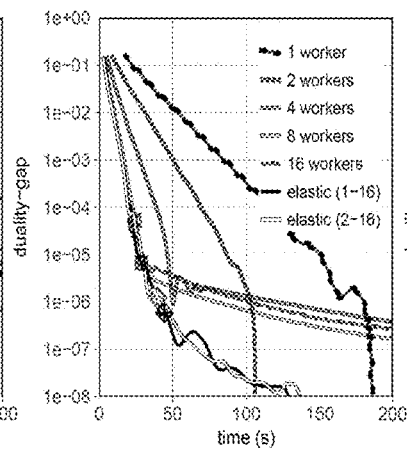
Figure 3F:
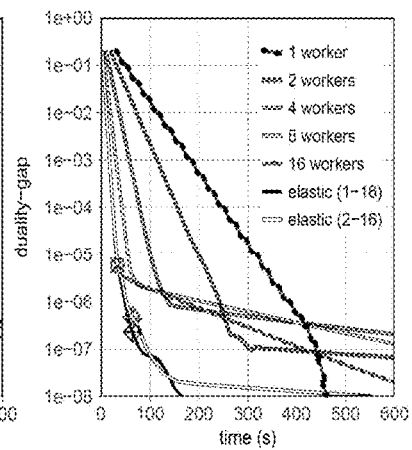

In an aspect, two characteristics of the CoCoA algorithm evoked in the background section are addressed. First, even assuming perfect scalability and no overheads, increasing the number of workers K does, in general, not reduce the time to reach a solution in the context of this algorithm. This is because the convergence rate of CoCoA degrades as K increases. Overall, CoCoA run is split into epochs. If increasing K reduces the run time of each epoch, this also decreases the convergence rate per epoch, hence requiring more epochs to reach a solution. Finding the number K of workers that minimizes the overall run time is not trivial and depends on the dataset considered.

Second, as the present Inventors further observed, the number of workers K that minimize run time changes as the algorithm progresses. FIGS. 1(a) and 1(b) shows the convergence rate obtained for K=1, 2, 4, 8, or 16 workers, using the so-called KDDA and Higgs datasets as examples. The convergence rate can be evaluated by plotting a quantity that is indicative of the convergence rate, e.g., the duality-gap, which is given by the distance between the primal and dual formulation of the training objective. The duality-gap has been shown to provide a robust certificate of convergence. Both examples (FIGS. 1(a) and 1(b)) show that for larger values of K, the duality-gap converges faster initially, but slows down earlier than for smaller values of K. I.e., smaller values of K eventually lead to a shorter time-to-(high)-accuracy than large values thereof. However, this is not universally true, as FIG. 1(c) shows for the RCV1 dataset, for which the convergence rate scales almost perfectly with K. Note, the training accuracy refers here to the accuracy of the solution to the optimization problem (i.e., a highly accurate solution corresponds to a very small value of the duality gap), rather than the classification accuracy of the resulting classifier.

Based on these observations, the present inventors have built a novel, elastic framework, e.g., an elastic, distributed ML framework, which reduces the time-to-accuracy. In embodiments, this framework is devised so as to robustly find (near-)optimal settings automatically and optimize resource usage by exploiting the drifting of the optimal number K of workers.

This novel framework is described in detail below. However, the ins and outs of the CoCoA algorithm are first described in detail, in the interest of a better understanding of the contributions of embodiments of the present invention. CoCoA is a distributed ML framework to train GLMs across K workers. The training data matrix A is partitioned column-wise across all workers and processed by local optimizers that independently apply updates to a shared vector v, which is synchronized periodically. In contrast to the mini-batch approach, local optimizers apply intermediate updates directly to their local version of the shared vector v, thus benefiting from previous updates within the same epoch.

Thanks to the immediate local updates to v by local optimizers, CoCoA may outperform previous state of-the-art mini-batch versions of SGD and SDCA. However, it may be realized that, for the same reason, it will not be trivial to efficiently scale-out CoCoA, as increasing the number of workers will not guarantee a decrease in time-to-accuracy, even when assuming perfect linear scaling and zero communication costs between epochs. The reason for this counter-intuitive behavior is that, as each local optimizer gets a smaller partition of A (i.e., it sees a "small picture" of the entire problem), the number of identifiable correlations within each partition decreases as well, thus leaving more correlations to be identified across partitions, which eventually makes the process slower due to infrequent synchronization steps.

Moreover, as indicated in the previous section, there is no K for which the convergence rate is maximal at all times. This poses a challenge about the selection of the best K. It is up to the user to decide in advance whether to train quickly to a low accuracy and wait longer to reach a high accuracy or vice versa. A wrong decision can lead to longer training times, wasted resources, and increased costs as computational resources are typically billed by the hour (at least in cloud offerings).

How can this be improved? Ideally, the system should automatically and dynamically select K, such that the convergence rate is maximal at any point in time, in order to minimize training time and resource waste. As FIG. 1(b) shows, the convergence rate, i.e., the slope of the curve, starting from the same level of accuracy, differs, depending on the setting for K. E.g, as the curve for K=16 flattens out when reaching $\approx$1e-5, the curves for K$\leq$8 become relatively steeper before flattening out too, one after the other. Hence, in order to stay within a region of fast convergence for as long as possible, the system could be forced to switch to a smaller number K' of workers, once the curve for the current K starts to flatten. One may assume that the convergence rate, when switching from K to K'<K workers at a certain level of accuracy, will follow a similar trajectory, as if the training had reached said level of accuracy starting with K' workers in the first place. The validity of this assumption can be verified, given that the learned models are, in both cases, not guaranteed to be identical.

Apart from the algorithmic side, adjusting K may give rise to practical issues on the system side, where voluminous training data are involved. For example, if every change in K incurs a transfer of potentially several gigabytes of training data between nodes, then such changes may overwhelm many systems as data (de-)serialization and transfer can be very time consuming. In that respect, a brute force implementation of the present framework in, e.g., Spark, may turn out to fail to a large degree due to the very time-consuming (de-)serialization of the training data, where very large training datasets are involved. In such cases, one should make sure that the overhead introduced by the adjustment of K remains small enough, such that a net benefit can be realized.

The following description is structured as follows. First, general embodiments and high-level variants are described (sect. 1). The next section (sect. 2) addresses a particularly preferred embodiment. Section 3 is directed to technical implementation details.

1. General Embodiments and High-Level Variants

Figure 4:
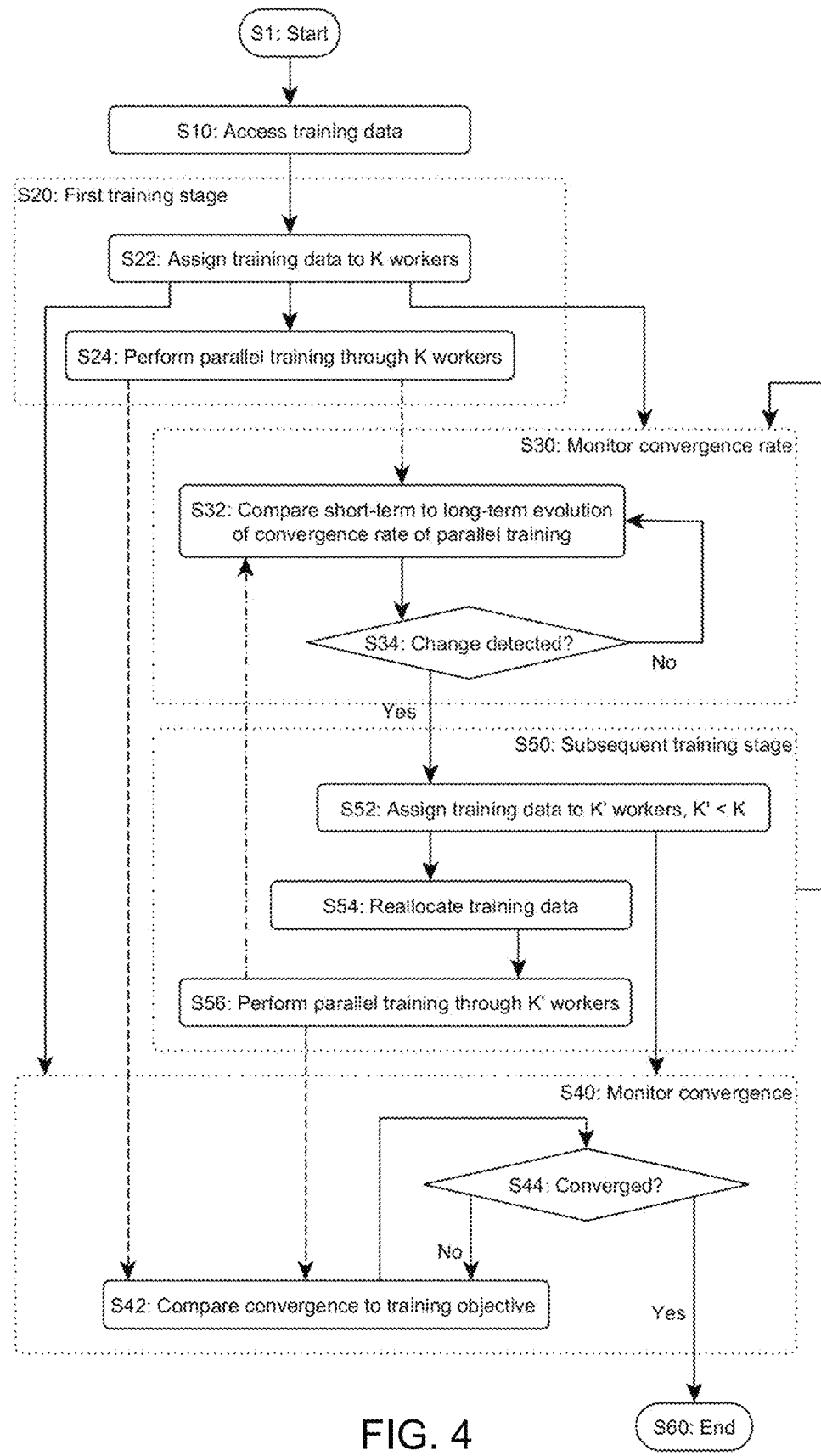
FIG. 4 is a flowchart illustrating high-level steps of a method of parallel training of a ML model, as in preferred embodiments.
Figure 5:
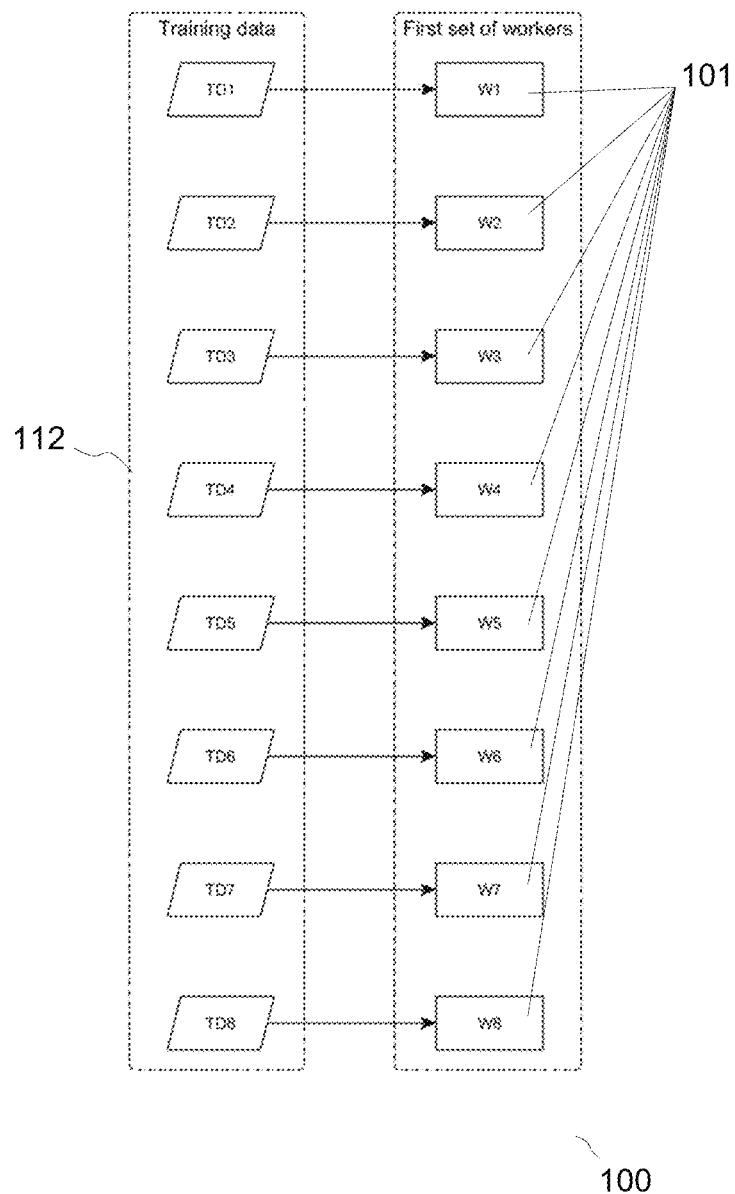
FIGS. 5 and 6 are block diagrams that schematically illustrate how training data can be allocated to workers, before a scale-in operation (FIG. 5) and upon scaling-in the parallel training (FIG. 6), as in embodiments.
Figure 6:
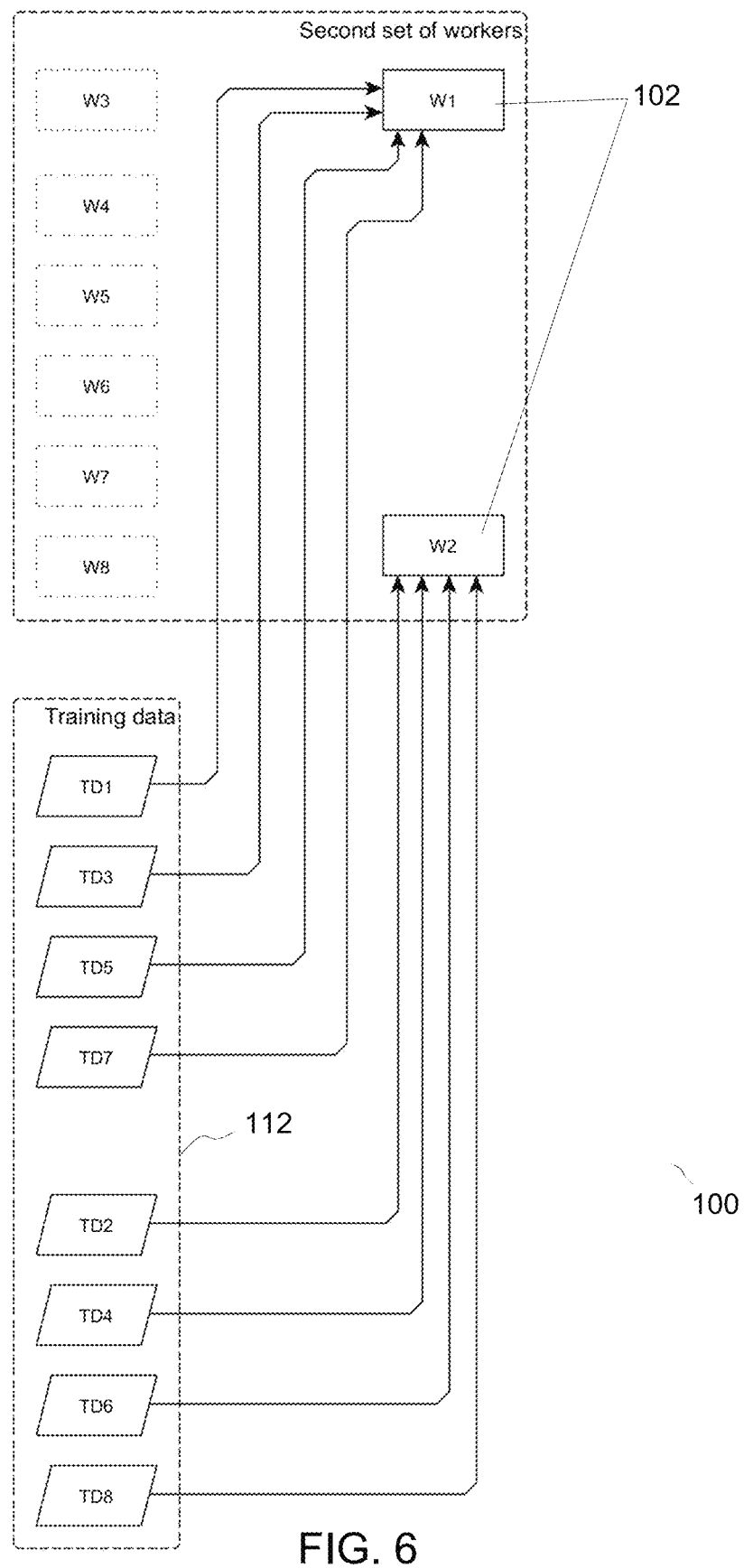

In reference to FIGS. 4-6, an aspect of the invention is first described, which concerns a computer-implemented method of parallel training of a ML model. This method is assumed to be performed on a computerized system 100 that is designed in a way that its computing tasks can be assigned to multiple workers 101, 102 of the system. The present method and its variants are collectively referred to as "the present methods" in this document.

Essentially, such methods first require accessing training data 112 (see step S10 in the flowchart of FIG. 4). Next, the parallel training of the ML model is started (step S20: "First training stage" in FIG. 4), based on training data as accessed as step S10. During the first phase S20, the training is distributed S22 through a first number K of workers 101, as illustrated in FIG. 5 (where a simple mapping of partitions is assumed). The number K of workers 101 is strictly larger than 1, e.g., K=2, 4, 8, 16, etc. This number shall preferably be an even number and, more preferably, a multiple of 4, for reasons that will become apparent later.

Next, upon detecting S34 a change in the temporal evolution of a quantity indicative of a convergence rate of the parallel training, a scale-in operation is carried out S52. The detected change reflects a deterioration of the convergence rate. The scale-in operations evoked herein refer to an adjustment of the parallelism of the training. That is, upon scaling-in S52 the parallel training of the ML model, the parallel training goes on (step S50: "Subsequent training stage") but is, from this time forth, distributed S54 through a second number K' of workers 102, where K>K'≥1.

The above process may possibly be repeated. E.g., several successive scale-in operations may be performed, depending on changes detected. In addition, in embodiments, the present approach may systematically lead to decrease the number K' of workers 102 upon adjusting the resources. That is, if an adjustment is decided based on detection of a deterioration of the convergence rate, then this adjustment will necessarily lead to redistribute training data through a smaller number of workers, unlike most readjustment processes.

Note, workers are computerized processes or tasks performed on nodes (computing entities) of the system that are used for the training. Thus, a worker generally refers to a process or task that executes part of the training algorithm, e.g., here according to a stochastic coordinate descent (SCD) algorithm. In practice in an embodiment, there is a single worker per node and/or machine. However, a worker can be multi-threaded. The training may thus be distributed across worker threads, as in embodiments. A worker thread can be regarded as a smallest sequence of programmed instructions that can be managed independently by a scheduler, here for training purposes.

The system may for example have a many-core computing architecture, e.g., with a low-latency, and high-bandwidth memory that is shared between the cores, as in embodiments described later in detail.

Scaling-in S50 the training as explained above happens to improve the convergence rate of the training and, thus, accelerates the training (i.e., reduces the time to convergence) in most situations experimented by the present Inventors. The chosen approach provides a distributed training scheme that allows a solution to be found, to any desired accuracy, and, this, for example, faster than with a static worker setting. Moreover, as present inventors concluded, this can be achieved in a robust manner, i.e., by using an optimal, or near-optimal, dynamic worker setting.

All this is now described in detail, in reference to particular embodiments of the invention. To start with, said ML model can be a generalized linear model, as mostly assumed in the following. In variants to linear models, however, neural networks may be trained in an essentially similar manner, i.e., following a two-step approach, whereby the number of workers is reduced upon detecting a deterioration of the convergence rate.

Referring to FIG. 2, said quantity can be chosen as the so-called duality-gap. As noted earlier, the duality-gap measures a distance between the primal formulation of the training objective and the dual formulation of this objective. Relying on such a metric has proved to provide a robust certificate of convergence when training a generalized model. In the present context, the temporal evolution of the duality-gap provides a surprisingly clear indicator, based on which it can confidently be decided whether to scale-in the training for improving the convergence rate, or not. Still, other metrics (albeit less efficient) may be contemplated, such as the magnitude of changes to a model.

Said change in the temporal evolution may for example be detected S34 by comparing S32 a short-term evolution of the duality-gap to a long-term evolution thereof. As the terminology suggests, the long-term evolution extends over a longer period of time than the short-term evolution. Relying on short-term and long-term evolutions provides robustness against outliers, it being noted that the duality-gap may not strictly decrease at all times. In variants, a suitably trained model may for example be used to detect the change in the temporal evolution.

Besides changes in the temporal evolution of the (quantity indicative of the) convergence rate of the parallel training, the convergence itself of the training need typically be monitored S40, so as to decide S44 when to stop S60 the training process, which requires inputs from the workers (dashed lines in FIG. 4). Similarly, step S32 too requires inputs from the workers (dotted-dashed lines in FIG. 4). Note, the depictions used in FIG. 4 are intended to concisely illustrate various steps as implemented in preferred embodiments. Such depictions should not be narrowly construed: some of the steps depicted in FIG. 4 can be performed in parallel (and/or in an intertwined fashion), or otherwise be concomitant. For example, steps S32, S42, and S56 can be performed in parallel (e.g., intertwined). Similarly, before the very first scale-in operation S52-S54, steps S32, S42, and S24 can be performed in parallel (e.g., intertwined) too. E.g., during or after each training iteration (at step S24 or S56), a feedback is sent from the workers for comparison purposes S32, S42, such that runs of steps S32, S42, and S24 (and later on steps S32, S42, and S56) are intertwined.

Referring to FIG. 4, the short-term evolution may for instance be compared S32 to the long-term evolution of the duality gap, so as to detect a "knee" of this temporal evolution, i.e., a substantial change that translates into a pronounced modification in the temporal slope. In that case, said knee corresponds to the change to be detected S34; it accordingly determines the moment in time, at which the training of the GLM is scaled-in S52. Note, the temporal evolution of the duality-gap may normally be captured as a dynamic dataset (e.g., a dynamically updated time series) that characterizes the duality-gap as the latter evolves in the course of the training process, as assumed in FIG. 2.

The training of the model may for example be scaled-in S52 upon detecting S34 a change in the slope of the temporal evolution of the duality-gap, as illustrated in FIG. 2. The (discrete) derivative of the duality-gap may for example be monitored S30 to that aim. If necessary, use can be made of $n^{th}$-order derivatives (n=1, 2, 3, . . . ), should this help in better estimating the knee. In practice, however, it is normally sufficient to rely on the first derivative only.

Said change may for example be detected S34 by monitoring the slope, e.g., by comparing S32 slopes of the temporal evolution of the duality-gap. That is, at a given time, a short-term slope (e.g., reflecting the slope of the duality-gap over the last few epochs) may be compared to a longer-term slope, i.e., the slope of the duality-gap over a larger number of epochs up to said given time, as illustrated in FIG. 2. And as suggested earlier, the short-term slope may notably be compared S32 to a longer-term slope so as to detect S34 a knee of the temporal evolution of the duality-gap. As said too, the detected knee determines a given moment in time, at which the parallel training is to be scaled-in.

Note, the short-term slope need not necessarily be directly compared to the long-term slope. For instance, in embodiments, the comparison made at step S32 is done so as for said given moment in time to be determined by the time at which $S_s \times d$ becomes smaller than $S_l$, where d is a factor that is larger than or equal to 1, e.g., $1 \leq d < 2$, while $S_s$ and $S_l$ are values characterizing the short-term slope and the long-term slope, respectively. The factor d, which defines a safe margin for deciding whether to scale-in or not, may for example be set to d=1.25, which value proves to be suitable in practice.

The long-term slope may for example be indicative of the convergence of the duality-gap over a period of time that extends since a last scale-in event operated at the computerized system 100 during the parallel training process. Conversely, the short-term slope will typically be indicative of the convergence of the duality-gap over a period of time corresponding to the most recent training epochs (or iterations) of the training, i.e., a period extending over a small number N of iterations, where N≥1 (e.g., N=2, 3, or 4). An iteration typically corresponds to one epoch, i.e., one pass through all training data samples. Note, an iteration is mostly equivalent to an epoch, but it does not have to be. The optimal fraction of an epoch that an iteration represents depends on several parameters, including the network and compute performance ratio. The present approach also works if an iteration is less than an epoch.

As said, the scale-in operation results in reducing the number of workers from K to K'. The second number K' may for example be determined according to the fraction K/m, where m is a constant factor, with m>1. Note, m is typically an integer number (m≥2). The constant factor m may for example be set to m=4, which turned out to work well in practice, as discussed in sect. 2. In variants, m is set to m=2. In all cases, the number K may advantageously be a multiple of m, provided the latter is an integer number. Now, depending on the values of m and K, the value K' may finally need be rounded to an integer number, so as to match a number of workers, e.g., using a Floor or Ceiling function. In other variants, the factor m may be dynamically optimized. In further other variants, the factor m may be considered as a constant factor.

As seen in FIGS. 5 and 6, the numbers K and K' of workers form respective sets 101, 102, which may overlap, to lower data transfers. Even, the second set 102 may be a subset of (e.g., fully contained in) the first set 101, so as to minimize such data transfers. In that case, workers from the first set 101 are dismissed (see for example workers W3-W8 depicted as boxes with dotted contours in FIG. 6), while others (W1, W2, plain contours) are maintained. Thus, the scale-in operated at step S52 may amount to partly re-allocate S54 training data to residual workers as retained in the second set 102. In variants, all training data may be re-allocated S54 to further workers (e.g., workers not comprised in the first set 101). This, however, may require larger data transfers.

As illustrated in FIG. 6, the reallocation S54 of the training data 112 may be performed by transferring such data in parallel between multiple pairs of workers formed between, on the one hand, workers of said first set 101 and, on the other hand, workers of said second set 102. The training data 112 are preferably transferred S54 according to a foreground data copy mechanism based on a remote direct memory access. For instance, if the second number K' of workers is determined according to the fraction K/m (m>1), then the data copy mechanism may be implemented so as to achieve a transfer rate of m×r, where r denotes a single-link bandwidth of the system 100. All this is discussed in detail in sect. 2.

Figure 7:
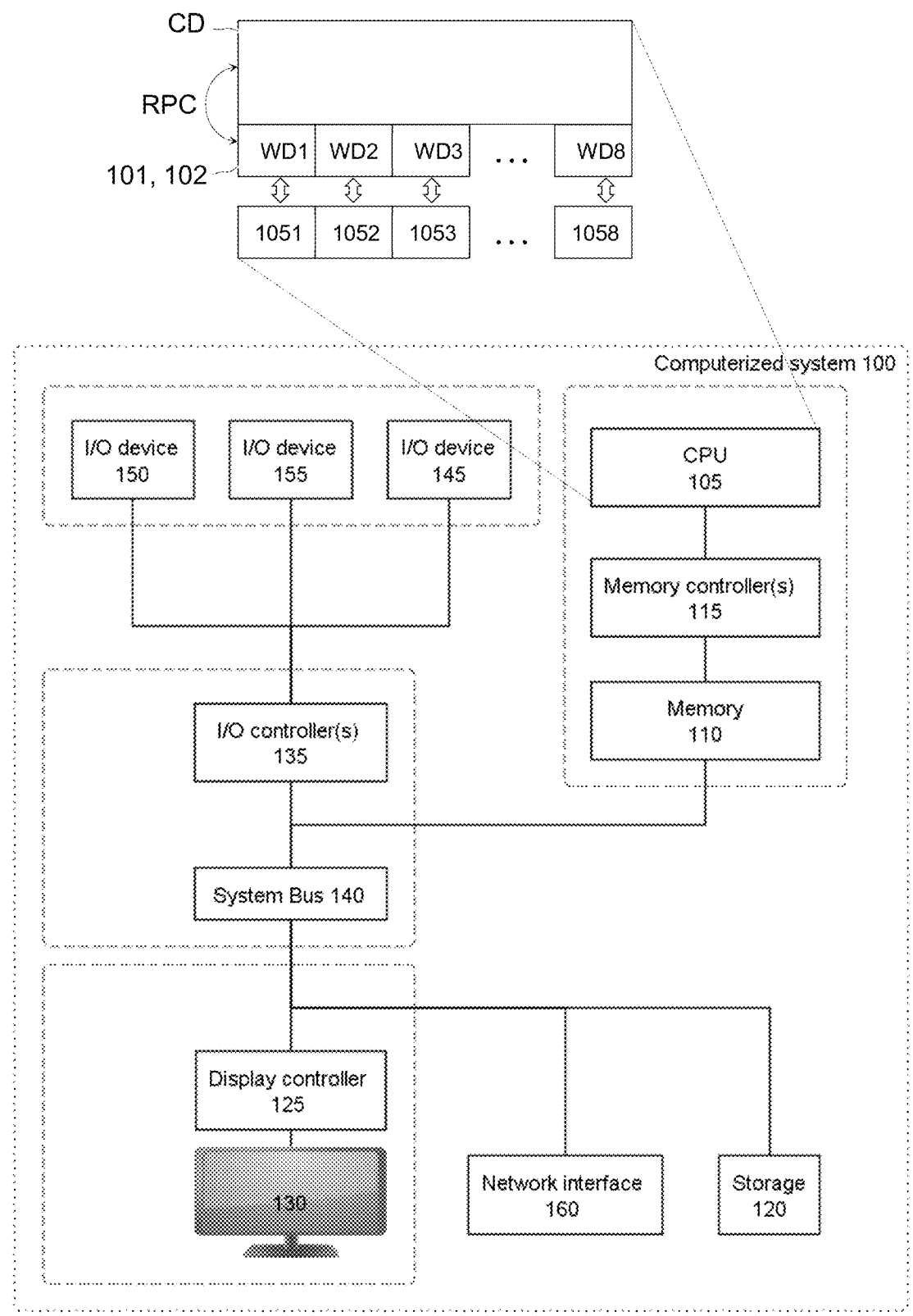
FIG. 7 schematically represents a general-purpose computerized system, suited for implementing method steps as involved in embodiments of the invention.

Referring to FIGS. 5-7, another aspect of the invention is now discussed, which concerns a computerized system 100. FIG. 7 depicts a possible architecture of a general-purpose computing system, designed so as to be able to assign computing tasks to multiple workers 101, 102 of the system 100. This system may otherwise include processing 105 and memory means 110, which are described in detail in sect. 2 and 3.1. The system 100 is assumed to store a computerized method (or a set of computerized methods, e.g., embodied as program instructions), to enable a parallel training of a ML model (e.g., a generalized linear model), as discussed earlier in reference to the present methods. The system 100 may for instance have a central processing unit (CPU) and/or a graphics processing unit (GPU) architecture. In all cases, the system 100 can be assumed to be able to dynamically partition the training data across the workers.

The system 100 is configured to access training data 112 and to start a parallel training of the ML model based on the accessed data 112, whereby the parallel training is first distributed through a first number K of workers 101, 102 of the system (K>1). Now, the system is further configured, upon detecting a change (e.g., a deterioration) in the temporal evolution of a quantity indicating the convergence rate of the training, to scale-in the parallel training of the model, as explained earlier in reference to the present methods. As a result, the parallel training is subsequently distributed through a second number K' of workers 101, 102, where K>K'≥1.

Assuming that the ML model is a generalized linear model, the system 100 may further be configured to monitor S40 the duality-gap of the training objective (see steps S42, S44). In that case, the system 100 may scale-in the parallel training upon detecting S34 a change in the duality-gap, according to computerized methods as stored thereon. As noted earlier, this change is preferably detected by comparing a short-term evolution of the duality-gap to a long-term evolution thereof. And more generally, the system 100 may be configured to implement any step as discussed earlier in reference to the present methods.

Next, according to a final aspect, the invention can be embodied as a computer program product for parallel training of a ML model on a computerized system such as described above. The computer program product comprises a computer readable storage medium having program instructions embodied therewith, where such program instructions are executable by processing means of the system 100 to cause the latter to implement steps as discussed earlier in reference to the present methods. Additional aspects of such computer program products are further discussed in sect. 3.2.

The above embodiments have been succinctly described in reference to the accompanying drawings and may accommodate a number of variants. Several combinations of the above features may be contemplated. Examples are given in the next section.

2. Specific Embodiments

The present subsection describes an implementation of an elastic framework that dynamically adjusts the number of workers based on feedback from the training algorithm, in order to select the number of workers that results in the highest convergence rate. Based on the evaluation of six datasets, the present Inventors have shown that this framework is able to accelerate the time-to-accuracy by a factor of up to 5.96× compared to the best static setting, while being robust enough to automatically find an optimal or near-optimal setting in most cases.

2.1 Elastic Framework

The present elastic framework is a distributed, auto-elastic ML system, which was developed based on the state-of-the-art CoCoA framework. The latter enables an efficient ML training with improved time-to-accuracy and optimized resource usage. As discussed in sect. 1, a concept of the present framework can be to dynamically reduce the number of workers (and therefore the training data partitions), starting from a set maximal number of workers, based on feedback from the training algorithm. The scheme can be rooted in the observation of a knee in the convergence rate, after which the convergence would slow down significantly, it being noted that this knee typically occurs at a lower duality-gap for fewer workers compared to more workers. This can be seen in FIG. 1(b), where the knee occurs at ≈1e−5 when using 16 workers and ≈1e−6 for 2 workers. The reasoning for adjusting the number of workers is the assumption that a CoCoA-like approach can be accelerated, if, by reducing the number of workers, it can stay "before" the knee for as long as possible.

2.1.1 Overview of the Preferred Elastic Framework

An embodiment of the framework implements a design in which a central driver CD coordinates one or more workers WD1 ... WD8, each running on a separate node 1051 ... 1058, as schematically depicted in FIG. 7. Driver and workers communicate via a remote procedure call (RPC) framework based on remote direct memory access (RDMA) to enable fast data transfer with minimal overhead. This framework can for instance be implemented in ≈3,000 lines of C++ code, including the RDMA-based RPC subsystem. Note, such a design is a common, simple way of implementing a distributed system. Other designs, however, can be contemplated.

The driver is responsible for loading, partitioning and distribution the training data, hence no shared file system is required to store the training data. It partitions the data into P≥K partitions for K workers (P=K is assumed in FIG. 5, for simplicity), such that each worker is assigned P/K partitions with P being the least common multiple of K and all potential scale-in sizes K'<K. Note, the central, CoCoA-like component can be implemented as a driver module. The workers implement a stochastic dual coordinate ascent (SDCA) optimizer. Each optimizer instance works on all partitions assigned to a worker, such that it can train with a "bigger picture" once partitions get reassigned to a smaller set 102 of workers. For each epoch, workers compute the partial primal and dual objective for their assigned partitions, which are sent to the driver, where the duality-gap is then computed and passed to a scale-in policy module.

2.1.2 Scale-In

An embodiment of the elastic framework enables efficient adjustment of the number of workers K (and the corresponding number of data partitions per worker process) using a decision policy and a RDMA-based data copy mechanism. In the present context in one embodiment, the elastic framework only scales-in, e.g., reduces the number of workers K and therefore redistributes the number of partitions P across fewer workers 102.

Scale-in policy. An embodiment of a scale-in policy attempts to determine the earliest point in time when it is beneficial to reduce the number of workers K (i.e., the beginning of the knee) while, at the same time, being robust against occasional outliers (i.e., exceptionally long epochs). To that end, use is made of the slope of the duality-gap over time to identify the knee. Two slopes are computed (see FIG. 2)—a long-term slope characterized by the value $S_l$, which reflects the convergence of the duality-gap since the last scale-in event—and a short-term slope $S_s$, which considers only the last N epochs, N being small. As soon as $S_s \times d < S_l$, the policy directs the driver process to initiate the scale-in mechanism. Larger values for N and d generally lead to a more robust decision with respect to occasional outlier epochs, however they also increase the decision latency, thus potentially failing to maximize benefits from an earlier scale-in. It was empirically determined that N=2 and d=1.25 works well across all evaluated datasets. Note, the present policy does not determine the optimal factor m of the scale-in, i.e., K→K/m. Rather, use is made of a fixed m=4, as tests have shown that the convergence rate difference for smaller m is often very small.

Scale-in mechanism. A simple, RDMA-based foreground data-copy mechanism is implemented to copy data from the workers to be removed (WD3-WD8 in FIGS. 5, 6) to remaining workers (WD1, WD2 in FIG. 6). As the data transfer occurs in parallel between multiple pairs of workers, one is able to exceed the maximal single-link bandwidth. For a scale-in from K to K/m workers and a single-link bandwidth of r (e.g., 10 Gb/s), it is possible to achieve a total transfer rate of m×r, e.g., 40 Gb/s to scale-in from 16 to 4 workers on a 10 Gb/s network.

2.1.3 Data Partitioning and In-Memory Representation

While a simple data partitioning scheme can be used (which simply splits the data into equally sized chunks as it is laid out in the input file), an in-memory layout is used, which is optimized for efficient local access as well as efficient data transfer between workers (see Listing 1 below). In the present elastic framework, data for each partition is stored consecutively in a Partition::data array, which circumvents the need for costly serialization. On the receiving side, a simple deserialization step is used to restore the Example::dp pointer into the Partition::data array for each Example. This data layout, combined with the use of RDMA, makes it possible to transfer data at a rate close to the hardware limit.

```
1    struct   Datapoint   { uint32_t feature ; float value ; };
2    struct   Example     { size_t size ; float label ; Datapoint *dp; };
3    struct   Partition   {
4    Example             *examples ; // pointer to examples array in 'data'
5    Datapoint           *datapoints ; // pointer to datapoints array in 'data '
6    double              *model ; // pointer to model vector insize 'data'
7    size_t              numExamples ; // number of examples
8    char                *data ; // contains all data (examples, datapoints, model)
9    size_t              size ; // total size of memory allocated for 'data '
10   };
```

Listing 1: In-Memory Data Structures of the Present Elastic Framework

Although an anticipatory background transfer mechanism was considered for the present purpose, evaluations performed by the Inventors (see Table 3 below) show that the overhead introduced by the above mechanism does not necessarily require this.

2.2 Evaluation

In the evaluation, an attempt is made to answer the question of how much a CoCoA-like algorithm can be improved by scaling-in the training and thus staying "in front of" the knee for as long as possible.

To answer this question, the time-to-accuracy (duality-gap) of a static CoCoA implementation is compared with the elastic algorithm, using a support-vector machine (SVM) training algorithm (use was made of a constant regularizer term $\lambda=0.01$) and the six datasets shown in Table 1. Static settings with 1, 2, 4, 8 and 16 workers were evaluated, as well as two elastic settings. The first elastic setting starts with 16 workers and scale-in to a single worker, as in scenarios where the entire dataset fits inside a single node's memory but limited CPU resources make distribution beneficial anyway. The second elastic setting starts with 16 workers but scale-in to only two workers, consistently with cases where a dataset exceeds a single node's memory capacity and a model therefore cannot be trained with non-distributed methods. As the convergence behavior for two or more nodes is similar (see FIG. 3), this also indicates how the present methods work in a larger cluster, e.g., when scaling from 64 to 8 nodes. All tests are run on a 17-node cluster, equipped with Intel Xeon E5-2640v3/E5-2650v2, 160-256 GB RAM and CentOS/Fedora 26 Linux, running 16 workers and 1 driver, connected by a Fourteen Data Rate (FDR, 56 Gb/s) Infiniband fabric.

TABLE 1

Datasets used in the evaluation

| Dataset | Examples | Features | Size in GB (in-memory) | Sparsity (in %) |
|---|---|---|---|---|
| RCV1 | 667,399 | 47,236 | 0.4 | 0.16 |
| KDDA | 20,216,830 | 8,407,752 | 2.6 | 1.8e−04 |
| Higgs | 11,000,000 | 28 | 2.5 | 92.11 |
| KDD12 | 54,686,452 | 149,639,105 | 17 | 2e−05 |
| Webspam | 350,000 | 16,609,143 | 10 | 0.02 |
| Criteo | 45,840,617 | 999,999 | 15 | 3.9e−03 |

The initial set of nodes is preferably chosen randomly, in each case. The results shown in FIGS. 3(a)-3(f) and Table 2 represent the best results obtained over six test runs for all schemes, to account for potential node speed variations. A test time limit of 10 minutes (not including data loading) was set. Time results include the computation of the duality gap.

The evaluation results show that the basic concept of the present elastic framework—to adjust the number of workers based on feedback from the training algorithm—has benefits for most evaluated datasets. When scaling down to a single worker, the present elastic framework shows an average speedup of 2× compared to the best static setting and 2.2× when scaling down to two workers. While the method chosen does not improve upon all evaluated settings and target accuracies (e.g., 1e−8 for KDDA, Webspam, RCV1), the slowdown (compared to the respective best static setting) is tolerable, and speedups are still achieved compared to non-optimal static settings. It is important to note that the optimal static setting is not necessarily known in advance and may require several test runs to determine. The present elastic framework, on the other hand, is able to find an optimal or near optimal setting automatically, which shows its robustness.

Table 2 below compares results obtained with an elastic setting with those obtained from the best static setting, in terms of speed-up factor.

TABLE 2

Speed-up factor of an elastic vs. the best static setting (the number of workers of the best static setting is given in parentheses) for reaching a target accuracy of 1e−6, 1e−7, and 1e−8. A minimal speedup factor is mentioned where the static setting has not reached the target accuracy within a 10-minute time-limit. The symbol "—" indicates that neither the elastic, nor a static setting has reached a target accuracy within that same time limit.

| Dataset | 1e−6 | 1e−7 | 1e−8 |
|---|---|---|---|
| (a) 1-16 workers | | | |
| RCV1 | 1.05 (16) | 1.06 (16) | 0.98 (8) |
| KDDA | 1.49 (1) | 1.12 (1) | 0.83 (1) |
| Higgs | 3.21 (4) | 3.14 (1) | 2.24 (1) |
| KDD12 | 2.75 (16) | >3.15 | >2.25 |
| Webspam | 1.25 (4) | 1.43 (2) | 0.82 (2) |
| Criteo | 2.82 (4) | 3.80 (2) | 2.76 (1) |
| (b) 2-16 workers | | | |
| RCV1 | 1.31 (16) | 1.12 (16) | 0.64 (8) |
| KDDA | >1.28 | — | — |
| Higgs | 3.46 (4) | 5.96 (16) | >3.63 |
| KDD12 | 2.57 (16) | >3.12 | >2.35 |
| Webspam | 1.12 (4) | 1.59 (2) | 0.77 (2) |
| Criteo | 2.63 (4) | 3.23 (2) | >1.08 |

Data-copy rates and overhead due to scaling-in were measured. Both metrics include the actual data-transfer, control plane overhead and data deserialization. The present Inventors measured data transfer rates of up to 5.8 GiB/s (1.4 GiB/s on average) and overheads as shown in Table 3 below. As the measured times do not constitute a significant overhead on the system, no background data transfer was implemented. For slower networks, such a method could be used to hide data transfer times behind regular computation.

TABLE 3

Total average scale-in overhead

| Setting | RCV1 | KDDA | Higgs | KDD12 | Webspam | Criteo |
|---|---|---|---|---|---|---|
| 1-16 workers | 0.12 s | 0.73 s | 0.71 s | 5.04 s | 2.78 s | 4.52 s |
| 2-16 workers | 0.06 s | 0.39 s | 0.38 s | 2.78 s | 1.53 s | 2.18 s |

2.3 Comparisons with Prior Art Approaches

To the best knowledge of the Inventors, the present elastic framework is the first elastic implementation of a CoCoA-like algorithm. Other elastic ML systems exist, but in contrast to the present framework, they target efficient resource utilization rather than reducing the overall run time. For example, a prior approach may include an elastic ML framework that over-partitions training data into P=n×K partitions for K physical workers. Elasticity is achieved by increasing or decreasing the amount of partitions per node. In contrast to the present elastic framework, such prior approach does not scale based on feedback from the training algorithm nor does it improve the per-epoch training algorithm convergence rate, as partitions are always processed independently of each other.

SLAQ is a cluster scheduler for ML applications. SLAQ also relies on feedback from ML applications. However, instead of optimizing the time to arbitrary accuracy for one application, SLAQ tries to minimize the time to low accuracy for many applications at the same time, by shifting resources from applications with low convergence rates to those with high rates, assuming that resources can be used more effectively there.

Another prior approach enables the run of ML applications using transient revocable resources, such as EC2's spot instances, by keeping worker state minimal at the cost of increased communication.

To conclude, the present work has experimentally shown that the optimal number of workers for CoCoA-like algorithms changes over the course of the training. Based on this observation, an elastic ML framework is proposed, which can outperform static CoCoA-like approaches for several datasets and settings by a factor of 2 to 2.2× on average, often, while using fewer resources. Note, the present approach can be adapted to include a dynamical optimization of a CoCoA-like algorithm in terms of training time and resource usage, as well as related use-cases, e.g., neural networks.

3. Technical Implementation Details

3.1 Computerized Systems

Computerized systems (including one or more computerized devices) can be suitably designed for implementing embodiments of the present invention. For instance, a suitable computerized system 100 may include one or more processing elements such as multi-core processors 105 (FIG. 7, hereafter referred to as the "processor") and a memory 110 coupled to a memory controller 115, which preferably enables remote procedure calls, as noted in sect. 2.1. The processor 105 is a hardware device for executing software, as, e.g., loaded in a main memory of the device. The processor can be any custom made or commercially available processor.

The memory 110 can include a combination of volatile memory elements (e.g., random access memory) and non-volatile memory elements, e.g., solid-state devices. The software in memory may include one or more separate programs, each of which may for instance comprise an ordered listing of executable instructions for implementing logical functions. In the example of FIG. 7, the software in the memory 110 includes a computerized method as described herein in accordance with exemplary embodiments and a suitable operating system (OS). The OS essentially controls the run of other computer (application) programs and provides scheduling, I/O control, file, data and memory management, and communication control as well as related services. In the present case, the scheduling of tasks is adapted so as to allow workers to be dynamically defined and training data to be re-allocated to such workers, in accordance with the present methods.

In exemplary embodiments, and in terms of hardware architecture, the system 100 may further include one or more input and/or output (I/O) devices 145, 150, 155 (or peripherals) communicatively coupled via a local input/output controller 135. The input/output controller 135 can comprise or connect to one or more buses 140 or other wired or wireless connections. The input/output controller 135 may have additional elements, which are omitted for simplicity, such as controllers, buffers (caches), drivers, and receivers, etc., to enable communications. Further, a local interface may include address, control, and/or data connections to enable appropriate communications among the aforementioned components.

Possibly, a conventional keyboard 150 and mouse 155 can be coupled to the input/output controller 135. Other I/O devices 145-155 may include other hardware devices, i.e., I/O devices that communicate both inputs and outputs. The system 100 may further include a display controller 125 coupled to a display 130. In exemplary embodiments, the system 100 may further include a network interface 160 or transceiver for coupling to a network (not shown).

The methods described herein can be in the form of executable program, script, or, more generally, any form of executable instructions.

In operation, one or more of the processing elements 105 execute software stored within the memory 110, to communicate data to and from the memory 110, and to generally control operations pursuant to software instructions. Separate memory elements may possibly be dedicated to each processing element of the processor 105, it being reminded that the system 100 preferably has a many-core computing architecture, e.g., with a low-latency, and high-bandwidth memory shared between the cores. As noted earlier too, a high bandwidth memory (HBM) is preferably relied upon, which is a high-performance RAM interface for 3D-stacked DRAM. The methods described herein, in whole or in part are read by the processor 105, typically buffered therein, and then run. When the methods described herein are implemented in software, the methods can be stored on any computer readable medium for use by or in connection with any computer related system or method.

Computer readable program instructions described herein can be downloaded to processing elements 105 from a computer readable storage medium, via a network, for example, the Internet and/or a wireless network. A network adapter card or network interface 160 in the device may receive the computer readable program instructions from the network and forwards the program instructions for storage in a computer readable storage medium 120 interfaced with the processing elements.

3.2 Computer Program Product

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction run device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the C programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be run substantially concurrently, or the blocks may sometimes be run in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the present invention has been described with reference to a limited number of embodiments, variants and the accompanying drawings, it will be understood by those skilled in the art that various changes may be made and equivalents may be substituted without departing from the scope of the present invention. In particular, a feature (device-like or method-like) recited in a given embodiment, variant or shown in a drawing may be combined with or replace another feature in another embodiment, variant or drawing, without departing from the scope of the present invention. Various combinations of the features described in respect of any of the above embodiments or variants may accordingly be contemplated, that remain within the scope of the appended claims. In addition, many minor modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims. In addition, many other variants than explicitly touched above can be contemplated.

What is claimed is:

1. A computer-implemented method of parallel training of a machine learning model on a computerized system, whose computing tasks can be assigned to multiple workers of the system, and wherein the method comprises:

accessing training data;

starting a parallel training of the machine learning model based on the accessed training data, the training distributed through a first number K of workers, K>1; and in response to detecting a change in a temporal evolution of a quantity indicative of a convergence rate of the parallel training, the change reflecting a deterioration of the convergence rate and providing an indicator for deciding whether to scale-in the training for improving the convergence rate in training the machine learning model, scaling-in the parallel training of the machine learning model, so as for the parallel training to be subsequently distributed through a second number K' of workers, where K>K'≥1, K' being determined to improve the convergence rate of the parallel training of the machine learning model, wherein K' further changes, wherein successive scale-in operations are repeated wherein number of workers in the parallel training is elastic and becomes less throughout the parallel training, wherein the number of workers is dynamically selected repeatedly during the parallel training to bring the convergence rate to maximal at points in time during the parallel training of the machine learning model, wherein the quantity is a duality-gap measuring a distance between a primal formulation of a training objective for the training and a dual formulation of this training objective, wherein the change is detected by comparing at least two slopes of the temporal evolution of the duality-gap, the at least two slopes including a short-term slope and a long-term slope, wherein the long-term slope is indicative of the convergence of the duality-gap over a period of time extending since a last scale-in event operated at the computerized system during the parallel training, wherein the short-term slope is indicative of the convergence of the duality-gap over a period of time extending over a finite number N of one or more most recent training epochs of the parallel training, N≥1.

2. The method according to claim 1, wherein
the machine learning model is a generalized linear model.

3. The method according to claim 1, wherein
the change in the temporal evolution is detected by comparing the short-term evolution of the duality-gap to the long-term evolution thereof, the long-term evolution extending over a longer period of time than the short-term evolution.

4. The method according to claim 3, wherein
the short-term evolution is compared to the long-term evolution so as to detect a knee of the temporal evolution of the duality-gap, wherein the knee corresponds to the change and determines a given moment in time, whereby the training of the generalized linear model is scaled-in at the given moment in time.

5. The method according to claim 1, wherein
the training of the generalized linear model is scaled-in upon detecting a change in a slope of the temporal evolution of the duality-gap.

6. The method according to claim 1, wherein
the short-term slope is compared to the long-term slope so as to detect a knee of the temporal evolution of the duality-gap, wherein the knee corresponds to the change and determines a given moment in time, whereby the parallel training of the generalized linear model is scaled-in at the given moment in time.

7. The method according to claim 6, wherein
the short-term slope is compared to the long-term slope so as for the given moment in time to be determined by a time at which $S_s \times d$ becomes smaller than $S_l$, wherein $S_s$ and $S_l$ are values characterizing the short-term slope and the long-term slope, whereas d is a factor such that $1 \leq d < 2$.

8. The method according to claim 7, wherein
the factor d is set to d=1.25.

9. The method according to claim 1, wherein
the finite number N is set to N=2.

10. The method according to claim 1, wherein
the second number K' is determined according to a fraction K/m, where in is a constant factor, m>1.

11. The method according to claim 10, wherein
the constant factor in is set to m=4.

12. The method according to claim 1, wherein:
the first number K of workers form a first set of workers;
the second number K' of workers form a second set of workers; and
scaling-in the parallel training comprises reallocating at least part of the training data as initially used by workers of the first set to workers of the second set.

13. The method according to claim 12, wherein
reallocating at least part of the training data comprises transferring such data in parallel between multiple pairs of workers between workers of the first set and workers of the second set.

14. The method according to claim 13, wherein
the training data are transferred according to a foreground data copy mechanism based on a remote direct memory access.

15. The method according to claim 14, wherein
the second number K' is determined according to a fraction Kim, where in is a constant factor, m>1, and
the data copy mechanism is implemented so as to achieve a transfer rate of m×r, where r denotes a single-link bandwidth of the system.

16. A computerized system having an architecture adapted for assigning computing tasks to multiple workers of the system, the computerized system including at least one hardware processor, wherein the computerized system stores a computerized method of parallel training of a machine learning model, whereby the system is configured to:

access training data;

start a parallel training of the machine learning model based on the accessed training data, the parallel training distributed through a first number K of workers of the system, K>1; and in response to detecting a change in a temporal evolution of a quantity indicative of a convergence rate of the parallel training, the change reflecting a deterioration of the convergence rate and providing an indicator for deciding whether to scale-in the training for improving the convergence rate in training the machine learning model, scale-in the parallel training of the machine learning model, so as for the parallel training to be subsequently distributed through a second number K' of workers, where K>K'≥1, K' being determined to improve the convergence rate of the parallel training of the machine learning model, wherein K' further changes, wherein successive scale-in operations are repeated wherein number of workers in the parallel training is elastic and becomes less throughout the parallel training, wherein the number of workers is dynamically selected repeatedly during the parallel training to bring the convergence rate to maximal at points in time during the parallel training of the machine learning model, wherein the quantity is a duality-gap measuring a distance between a primal formulation of a training objective for the training and a dual formulation of this training objective, wherein the change is detected by comparing at least two slopes of the temporal evolution of the duality-gap, the at least two slopes including a short-term slope and a long-term slope, wherein the long-term slope is indicative of the convergence of the duality-gap over a period of time extending since a last scale-in event operated at the computerized system during the parallel training, wherein the short-term slope is indicative of the convergence of the duality-gap over a period of time extending over a finite number N of one or more most recent training epochs of the parallel training, N≥1.

17. The computerized system according to claim 16, wherein
the machine learning model is a generalized linear model, whereby the system is configured to scale-in the parallel training upon detecting the change in the duality-gap, according to the computerized method.

18. The computerized system according to claim 17, wherein
the long-term evolution extending over a longer period of time than the short-term evolution.

19. A computer program product for parallel training of a machine learning model on a computerized system, whose computing tasks can be assigned to multiple workers of the system, the computer program product comprising a computer readable storage medium having program instructions embodied therewith, the program instructions executable on the computerized system to cause the latter to:
  access training data;
  start a parallel training of the machine learning model based on the accessed training data, the parallel training distributed through a first number K of workers of the system, K>1; and
  in response to detecting a change in a temporal evolution of a quantity indicative of a convergence rate of the parallel training, the change reflecting a deterioration of the convergence rate and providing an indicator for deciding whether to scale-in the training for improving the convergence rate in training the machine learning model, scale-in the parallel training of the machine learning model, so as for the parallel training to be subsequently distributed through a second number K' of workers, where K>K'≥1, K' being determined to improve the convergence rate of the parallel training of the machine learning model, wherein K' further changes, wherein successive scale-in operations are repeated wherein number of workers in the parallel training is elastic and becomes less throughout the parallel training, wherein the number of workers is dynamically selected repeatedly during the parallel training to bring the convergence rate to maximal at points in time during the parallel training of the machine learning model, wherein the quantity is a duality-gap measuring a distance between a primal formulation of a training objective for the training and a dual formulation of this training objective, wherein the change is detected by comparing at least two slopes of the temporal evolution of the duality-gap, the at least two slopes including a short-term slope and a long-term slope, wherein the long-term slope is indicative of the convergence of the duality-gap over a period of time extending since a last scale-in event operated at the computerized system during the parallel training, wherein the short-term slope is indicative of the convergence of the duality-gap over a period of time extending over a finite number N of one or more most recent training epochs of the parallel training, N≥1.

20. The computer program product according to claim 15, wherein
the long-term evolution extending over a longer period of time than the short-term evolution.

* * * * *